United States Patent [19]

Lunt

[11] 4,057,468
[45] Nov. 8, 1977

[54] NUCLEAR REACTOR FUEL ELEMENT SUB-ASSEMBLIES

[75] Inventor: Anthony Randle Lunt, Warrington, England

[73] Assignee: United Kingdom Atomic Energy Authority, London, England

[21] Appl. No.: 660,280

[22] Filed: Feb. 23, 1976

[30] Foreign Application Priority Data

Mar. 3, 1975 United Kingdom ................ 8791/75

[51] Int. Cl.² .............................................. G21C 3/30
[52] U.S. Cl. ...................................... 176/78; 176/40; 176/76; 176/79
[58] Field of Search ................. 176/40, 50, 61, 76, 176/78, 79, 81

[56] References Cited

U.S. PATENT DOCUMENTS

| 3,619,367 | 11/1971 | Gumuchian | 176/78 |
| 3,713,971 | 1/1973 | Van Santen et al. | 176/78 X |
| 3,854,524 | 12/1974 | Gregorie et al. | 176/78 X |
| 3,920,517 | 11/1975 | Sasaki et al. | 176/78 |

FOREIGN PATENT DOCUMENTS 239,932  5/1966  Austria ................................ 176/79

Primary Examiner—Peter A. Nelson
Attorney, Agent, or Firm—Larson, Taylor and Hinds

[57] ABSTRACT

An elongate fuel element sub-assembly for use in a liquid metal cooled fast breeder nuclear reactor is adapted at a base end region for plugging into core support means and at the upper free end there is inertia damping means to prevent excessive vibration.

3 Claims, 3 Drawing Figures

NUCLEAR REACTOR FUEL ELEMENT SUB-ASSEMBLIES

BACKGROUND OF THE INVENTION

This invention relates to liquid metal cooled fast breeder nuclear reactors and to fuel element sub-assemblies therefor.

In fast breeder nuclear reactors it is common to divide the fuel assembly into replaceable fuel element sub-assemblies each comprising a bundle of fuel pins contained within a wrapper or shroud through which liquid metal is flowed in heat exchange with the fuel pins. In one known construction of nuclear reactor the fuel element sub-assemblies are upstanding from a carrier associated with a core supporting diagrid and are arranged in groups and urged into leaning abutment with a central support member for each group of sub-assemblies. The upper regions of the sub-assemblies contain massive steel shielding to form, in combination, an upper shield for the core. Thus with the weight mass being disposed at the upper free end of each sub-assembly there is a tendency for vibration to be set up by coolant flow through the sub-assembly. It is expected that in one envisaged construction of reactor core the amplitude of vibration of the tip of a sub-assembly could be 1.0 mm and, apart from the deleterious effect on the mechanical reliability of the reactor core, such amplitude of vibration could create excessive reactivity noise, that is, it could create slight, variable reactivity changes.

SUMMARY OF THE INVENTION

According to the invention in a liquid metal cooled fast breeder nuclear reactor having a core comprising a plurality of elongate fuel element sub-assemblies upstanding from core support means, each sub-assembly has inertia damping means at a free upper end region.

In a preferred construction of fuel element sub-assembly for a nuclear reactor according to the invention the inertia damping means comprises upper and lower sleeves mounted on a tubular spine, the lower sleeve being rigidly attached to the spine and secured atop a fuel containing tubular wrapper of the sub-assembly whilst the upper sleeve is resiliently attached to the lower sleeve and radially spaced from the spine there being duct means for enabling liquid metal to flood the radial spacing of the upper sleeve and spine when the sub-assembly is submerged in reactor coolant. In use, the device operates on a tuned inertia damping principle using liquid metal as the damping medium; when the upper sleeve vibrates the liquid metal is forced from one side of the spacing to the other and its resistance to this motion provides a damping force.

For the optimum damping effect the mass of the upper sleeve needs to be as large as possible in relation to the mass of the lower region of the sub-assembly and from this aspect it is convenient to comprise the upper sleeve of massive steel neutron shielding.

Preferably, the resilient attachment of the upper and lower sleeves comprises a bellows unit which is easily constructed and unlikely to break into small pieces should it fail through fatigue.

DESCRIPTION OF THE DRAWINGS

A construction of fuel element sub-assembly incorporating the invention and a liquid metal cooled fast breeder nuclear reactor core will now be described, by way of example, with reference to the accompanying drawings wherein.

DESCRIPTION OF THE PREFERRED EMBODIMENT

Figure 3:
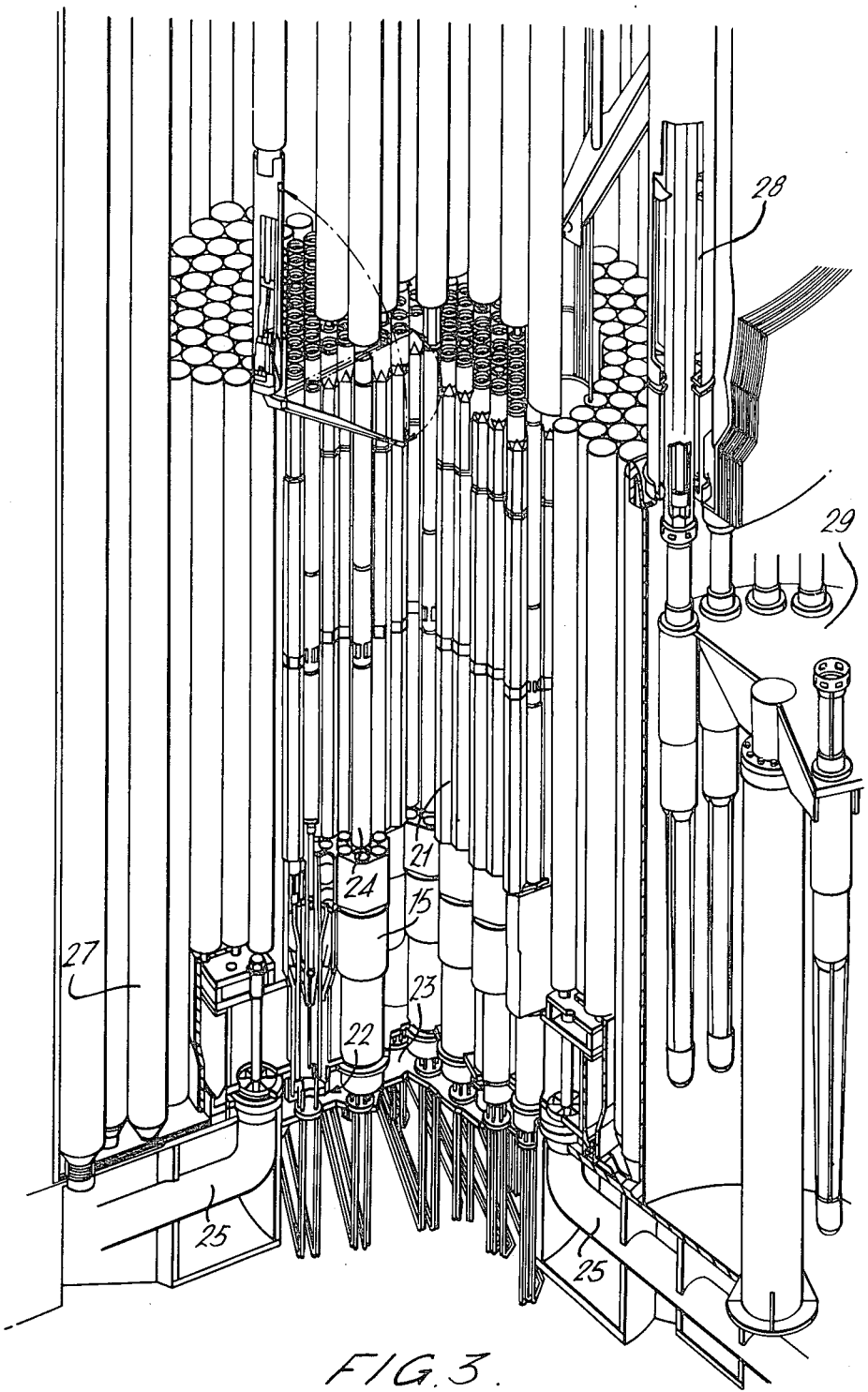
FIG. 3 is a fragmentary sectional view of a liquid metal cooled fast breeder nuclear reactor core.

The liquid metal cooled nuclear reactor core shown in FIG. 3 comprises a plurality of upstanding fuel element sub-assemblies 21 closely arranged side-by-side and secured at their lower ends to fuel support means 22. The support means 22 comprises a diagrid 23 and a plurality of fuel sub-assembly carriers 15 each of which is adapted to carry a group of fuel element sub-assemblies. The diagrid 23 also serves as a distributor for coolant flow to the fuel element sub-assemblies the coolant being delivered to the diagrid 23 by way of pipes 25. At the centre of each group of fuel element sub-assemblies 21 there is a control rod guide tube 24 and the entire assembly of fuel element sub-assemblies and control rod guide tubes is surrounded by a plurality of neutron shield rods 27. A fuel charge chute and fuel storage rotor are shown at 28 and 29. On assembly of the core the fuel element sub-assemblies 21 are free standing with small clearances between neighbouring assemblies.

Figure 1:
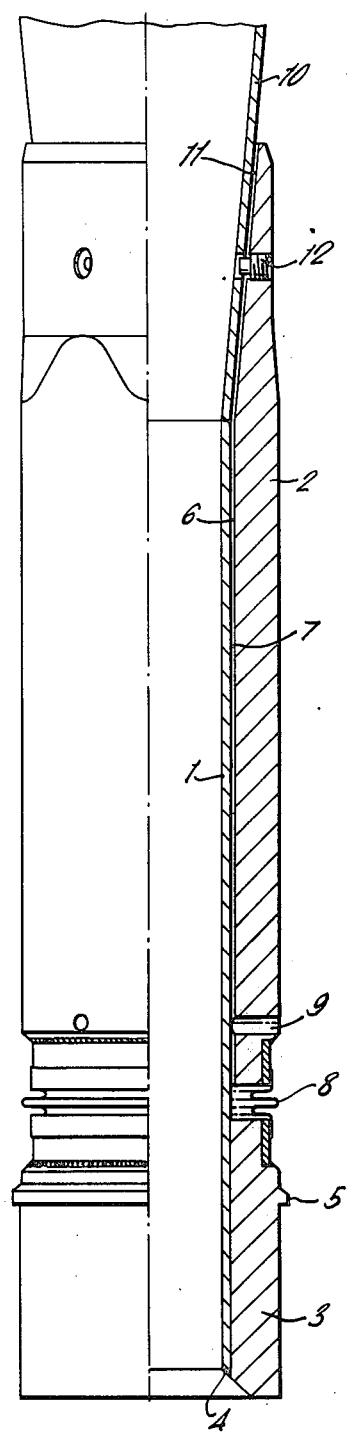
FIG. 1 is a part sectional view of an inertia damping means.
Figure 2:
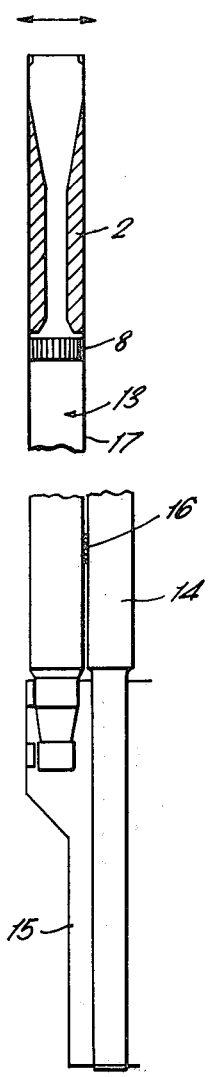
FIG. 2 is a fragmentary diagrammatic view of a nuclear reactor core.

The fuel element sub-assemblies 21 are arranged in groups of sub-assemblies and the upstanding sub-assemblies of each group are disposed about a central member 14 (such as a control rod guide tube 24) of the group and are arranged to lean on the central member. The arrangement is shown in FIG. 2 and the sub-assemblies and central members, designated 13 and 14 in FIG. 2, plug into the carrier 15 associated with the core supporting diagrid. Contact between each sub-assembly and the central member is through a pad 16 attached to the sub-assembly. The inertia damper is shown attached to the top of a wrapper 17 of the sub-assembly and the upper sleeves 2 of the sub-assemblies, in combination, provide an upper shield for the reactor core. The inertia damper shown in detail in FIG. 1 comprises a cylindrical tubular spine 1 having upper and lower sleeves 2, 3. The lower sleeve 3 is welded to the spine 1 at 4 and is of hexagonal shape to provide an end plug for the hexagonal wrapper of a fast breeder reactor sub-assembly; the lower sleeve 3 has a flange 5 for abutting the end of the wrapper. The upper sleeve 2 is of massive steel to provide neutron shielding of hexagonal cross-section and has a cylindrical bore 6 there being a radial spacing 7 between the spine 1 and the upper sleeve 2. The upper and lower sleeves 2, 3 are resiliently coupled together by a bellows unit 8 and the lower end of the upper sleeve 2 has six spaced radial ducts 9 for enabling liquid metal coolant to flood the radial spacing 7. The spine 1 has a diverging tubular extension 10 attached to its upper end and the upper sleeve 2 has a complementary diverging bore 11. The sleeve 2, being captive, is retained on the spine by means of six radially extending retaining pegs 12.

In operation, the reactor core is submerged in a pool of liquid metal coolant which is flowed upwardly through the sub-assembly wrappers in heat exchange with fuel pins therein. The radial spacings between the sleeves and the spines are flooded with liquid sodium so that when the upper sleeves vibrate the sodium in each radial spacing is forced from one side of the radial spacing to the other and its resistance to this motion provides a damping force. The damping force changes with the amplitude at a slow rate initially but finally at a very rapid rate so that, for average amplitudes, the damping rate is higher than that predicted for zero amplitude. Thus as a result of hardening of the damping rate with displacement of the upper sleeve relative to the spine, the final damping rate is so high that metal-to-metal contact between spine and upper sleeve is very unlikely. There is also a tendency for the upper sleeve to pump itself into concentricity with the spine even though concentricity may not be achieved in manufacture. The expected reduction in sub-assembly vibration amplitudes using such a device is in the region of 3 to 10 times.

In inertia damping means for a fuel element sub-assembly wherein the upper sleeve has a bore of 90 mm nominal and parallel length 350 mm, a radial clearance between spine and upper sleeve of 1.20 mm is considered to be satisfactory.

I claim:

1. A fuel element sub-assembly for a liquid metal cooled fast breeder nuclear reactor, the fuel element sub-assembly being elongate and having a base end region adapted for plugging into fuel assembly support means, and inertia damping means disposed at an upper end region of the sub-assembly, the inertia damping means comprising:
   a lower sleeve rigidly attached to the fuel element sub-assembly;
   a tubular spine rigidly and co-axially attached to the lower sleeve;
   an upper sleeve mounted co-axially on the tubular spine with a radial spacing therebetween and resiliently coupled to the lower sleeve, the upper sleeve having coolant flow ducts extending therethrough to the radial clearance.

2. A fuel element sub-assembly according to claim 1 wherein the upper sleeve is of massive steel neutron shielding.

3. A fuel element sub-assembly according to claim 1 wherein the resilient coupling of the upper and lower sleeves comprises an expandible bellows unit.

* * * * *